United States Patent
Li et al.

(10) Patent No.: US 12,327,377 B2
(45) Date of Patent: Jun. 10, 2025

(54) OBTAINING METHOD FOR IMAGE COORDINATES OF POSITION INVISIBLE TO CAMERA, CALIBRATION METHOD AND SYSTEM

(71) Applicant: Black Sesame Technologies Inc., San Jose, CA (US)

(72) Inventors: Huiyan Li, Shanghai (CN); Yangyang Li, Shanghai (CN); Tao Zhang, Shanghai (CN); Yicheng Zhang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 583 days.

(21) Appl. No.: 17/703,397

(22) Filed: Mar. 24, 2022

(65) Prior Publication Data
US 2022/0309710 A1  Sep. 29, 2022

(30) Foreign Application Priority Data
Mar. 29, 2021 (CN) .......................... 202110335327.4

(51) Int. Cl.
*G06T 7/80* (2017.01)
*G06T 3/20* (2006.01)
(Continued)

(52) U.S. Cl.
CPC ................. *G06T 7/80* (2017.01); *G06T 3/20* (2013.01); *G06T 3/60* (2013.01); *G06T 7/62* (2017.01);
(Continued)

(58) Field of Classification Search
CPC .... G06T 7/80; G06T 3/20; G06T 3/60; G06T 7/62; G06T 7/90; G06T 2207/10024;
(Continued)

(56) References Cited

U.S. PATENT DOCUMENTS

2017/0094251 A1* 3/2017 Wolke ..................... G06T 7/593
2017/0188015 A1* 6/2017 Heidemann .......... H04N 13/239
(Continued)

FOREIGN PATENT DOCUMENTS

| CN | 102692236 A | 9/2012 |
| CN | 105205858 A | 12/2015 |

(Continued)

OTHER PUBLICATIONS

Baobei Xu, Jiangxin Yang, Yanpeng Cao, Research on 3D thermography reconstruction based on depth sensor, Zhejiang University, China Academic Journal Electronic Publishing House. http://www.cnki.net.

(Continued)

*Primary Examiner* — Stephen R Koziol
*Assistant Examiner* — Ashley L. Hytrek
(74) *Attorney, Agent, or Firm* — Timothy T. Wang; Ni, Wang & Massand, PLLC

(57) ABSTRACT

An obtaining method for image coordinates of a position invisible to a camera, a calibration method and a system are disclosed. A first color image and corresponding depth image of a position to be measured invisible to a main camera are obtained from a depth camera. The depth camera is positioned so that the position to be measured is within a field of view of the depth camera. Three-dimensional coordinates of the position to be measured are extracted from the first color image and corresponding depth image. And the three-dimensional coordinates of the position to be measured are converted into the required image coordinates of the position to be measured by a translation matrix and a rotation matrix for converting a depth camera coordinate system into a main camera coordinate system. The translation matrix and the rotation matrix are determined by calibration between the main camera and the depth camera.

14 Claims, 5 Drawing Sheets

(51) Int. Cl.
*G06T 3/60* (2024.01)
*G06T 7/62* (2017.01)
*G06T 7/90* (2017.01)

(52) U.S. Cl.
CPC ...... *G06T 7/90* (2017.01); *G06T 2207/10024* (2013.01); *G06T 2207/10028* (2013.01); *G06T 2207/30204* (2013.01); *G06T 2207/30252* (2013.01)

(58) Field of Classification Search
CPC . G06T 2207/10028; G06T 2207/30204; G06T 7/70; G06T 3/00; G06T 2207/30252
See application file for complete search history.

(56) References Cited

U.S. PATENT DOCUMENTS

| | | | |
|---|---|---|---|
| 2017/0302909 A1* | 10/2017 | Finn | G01C 25/00 |
| 2020/0082564 A1* | 3/2020 | Kaczor | G06T 7/74 |
| 2022/0092819 A1* | 3/2022 | Jiang | G06T 7/11 |
| 2022/0309710 A1 | 9/2022 | Li et al. | |

FOREIGN PATENT DOCUMENTS

| | | | | |
|---|---|---|---|---|
| CN | 109272555 A | | 1/2019 | |
| CN | 109492513 A | | 3/2019 | |
| CN | 109741405 A | | 5/2019 | |
| CN | 109816703 A | | 5/2019 | |
| CN | 112233189 A | | 1/2021 | |
| CN | 112258658 A | | 1/2021 | |
| CN | 112381886 A | | 2/2021 | |
| CN | 112435206 A | * | 3/2021 | ............ G06T 17/00 |
| CN | 112132906 A | | 7/2023 | |

OTHER PUBLICATIONS

Kartik E. Cholachgudda, et., Geometric Calibration of a Time-of-Flight Depth Sensor and a Colour Camera Pair, 2019 11th International Conference on Advanced Computing 978-1-7281-5286-8/19.

Zheng Liu, Research on Robot Target Position Gesture Estimation and Grab, Harbin Engineering University, China Academic Journal Electronic Publishing House. http://www.cnki.net.

* cited by examiner

OBTAINING METHOD FOR IMAGE COORDINATES OF POSITION INVISIBLE TO CAMERA, CALIBRATION METHOD AND SYSTEM

CROSS REFERENCE TO RELATED APPLICATION

This patent application claims the benefit and priority of Chinese Patent Application No. 202110335327.4 filed on March 29, the disclosure of which is incorporated by reference herein in its entirety as part of the present application.

TECHNICAL FIELD

The present disclosure relates to the technical field of image measurement and machine vision, and more specifically, to an obtaining method for pixel coordinates of an invisible position, a calibration method and a system.

BACKGROUND ART

With the development of automatic driving, cameras (such as IR camera or RGB camera) need to be installed on the vehicle to provide assistance for the realization of automatic driving. However, due to certain restrictions on the field of view of the camera, it is impossible to obtain the image coordinates of invisible positions (i.e. positions not within the field of view of the camera, such as the rear-view mirror, front window glass, instrument panel, etc.) in the camera coordinate system by a single camera. However, during actual driving, the image coordinate information about these positions might be very important for automatic driving. Currently, multiple auxiliary cameras or mirrors are generally used to help obtain this kind of image coordinates, however, it is complex to realize and easy to cause large errors.

Therefore, it is necessary to provide an obtaining technology for image coordinates of the position invisible to a camera, so that the image coordinates of the position outside the field of view of the camera can be obtained, which is relatively simple to implement and will not cause large errors.

SUMMARY

In view of the above, the disclosure provides an obtaining method for image coordinates of a position invisible to a camera, a calibration method and a system, so that the image coordinates of the position outside the field of view of the camera can be obtained in a relatively simple way with less error.

A first aspect of the disclosure is to provide an obtaining method for image coordinates of a position invisible to a camera. The obtaining method includes the steps as follows. A first color image and a corresponding depth image of a position to be measured invisible to a main camera are obtained from a depth camera, wherein the depth camera is positioned so that the position to be measured is within a field of view of the depth camera. Three-dimensional coordinates of the position to be measured are extracted from the first color image and the corresponding depth image. And the three-dimensional coordinates of the position to be measured are converted into the required image coordinates of the position to be measured by using a translation matrix and a rotation matrix for converting a depth camera coordinate system into a main camera coordinate system, wherein the translation matrix and the rotation matrix are determined by calibration between the main camera and the depth camera.

In an embodiment, the position to be measured is directly behind the main camera, and the depth camera is positioned in a position directly opposite to the main camera.

In an embodiment, the position to be measured is a position area to be measured, and the image coordinates of the position to be measured include image coordinates of each boundary point of the position area to be measured.

In an embodiment, the position to be measured is a position point to be measured, and the image coordinates of the position to be measured include image coordinates of the position point to be measured.

A second aspect of the disclosure is to provide a calibration method between a main camera and a depth camera. The depth camera is positioned so that the expected position to be measured invisible to the main camera is within a field of view of the depth camera. The calibration method includes the steps as follows. Multiple second color images of a first surface of a calibration plate are obtained from the main camera, and multiple third color images and corresponding depth images of the second surface of the calibration plate are obtained from the depth camera. Multiple feature point image coordinates of multiple feature points on the calibration plate are determined based on each second color image. Multiple feature point three-dimensional coordinates of the multiple feature points are determined based on each third color image and the corresponding depth images. A translation matrix and a rotation matrix for converting a depth camera coordinate system into a main camera coordinate system are calculated based on all the determined feature point three-dimensional coordinates and all the determined feature point image coordinates.

In an embodiment, the calibration plate is placed between the main camera and the depth camera, the first surface of the calibration plate is within the field of view of the main camera, and the second surface of the calibration plate is within the field of view of the depth camera. The first surface of the calibration plate includes the multiple feature points, and the second surface of the calibration plate includes multiple marking points related to the multiple feature points.

In an embodiment, the multiple second color images are captured by the main camera when the calibration plate is in multiple different poses, and the multiple third color images and the corresponding depth images are captured by the depth camera when the calibration plate is in multiple different poses.

In an embodiment, the first surface of the calibration plate is a front of the calibration plate, and the second surface of the calibration plate is a back of the calibration plate.

In an embodiment, the first surface includes a chessboard grid plane composed of multiple squares. The multiple feature points are intersections of any four adjacent squares in the multiple squares. The second surface includes at least three marking points, and each marking point is located on a position on the second surface opposite to one of four corners of the chessboard grid plane.

In an embodiment, determining multiple feature point three-dimensional coordinates of the multiple feature points based on each third color image and the corresponding depth images includes the steps as follows. Marking point three-dimensional coordinates of each marking point are extracted from the third color images and the corresponding depth images. And intersection three-dimensional coordinates of all the intersections are calculated as the multiple feature point three-dimensional coordinates based on all the marking point three-dimensional coordinates.

In an embodiment, determining multiple feature point image coordinates of multiple feature points on the calibration plate based on each second color image includes the steps as follows. The intersection image coordinates of all the intersections are extracted from the second color images as the multiple feature point image coordinates.

A third aspect of the disclosure is to provide an obtaining system for image coordinates of a position invisible to a camera, including a main camera, a depth camera and a computing device. Both the main camera and the depth camera are connected with the computing device. The depth camera is positioned so that the position to be measured invisible to the main camera is within a field of view of the depth camera, and is configured to capture a first color image and a corresponding depth image of the position to be measured invisible to the main camera. And the computing device includes a processor that, when in operation, implements the obtaining method of the first aspect of the present disclosure.

A fourth aspect of the disclosure is to provide a calibration system between a main camera and a depth camera, including a main camera, a depth camera, a calibration plate and a computing device. Both the main camera and the depth camera are connected with the computing device. The main camera is configured to capture multiple second color images of a first surface of the calibration plate. The depth camera is positioned so that an expected position to be measured invisible to the main camera is within a field of view of the depth camera, and is configured to capture multiple third color images and corresponding depth images of a second surface of the calibration plate. And the computing device includes a processor that, when in operation, implements the calibration method of the second aspect of the present disclosure.

In an embodiment, the calibration plate is placed between the main camera and the depth camera, the first surface of the calibration plate is within the field of view of the main camera, and the second surface of the calibration plate is within the field of view of the depth camera. The first surface of the calibration plate includes the multiple feature points, and the second surface of the calibration plate includes multiple marking points related to multiple feature points.

DETAILED DESCRIPTION OF THE EMBODIMENTS

In order to make the above objects, features and advantages of the disclosure more obvious and easier to understand, the specific embodiments of the disclosure are described in detail below in combination with the accompanying drawings. Many specific details are set forth in the following description to facilitate a full understanding of the disclosure. However, the disclosure can be implemented in many other ways different from those described herein. Those skilled in the art can make similar improvements without violating the connotation of the disclosure. Therefore, the disclosure is not limited by the specific embodiments disclosed below.

In the description of this specification, the terms "first", "second" and "third" are only used to distinguish different technical features, and cannot be understood as indicating or implying the relative importance or order of the indicated technical features, nor as implying or indicating the number of technical features. Thus, the features defining "first", "second" and "third" may explicitly or implicitly include one or more of the features. In addition, in the description of the disclosure, "multiple" or "at least one" means two or more, unless otherwise expressly and specifically defined.

Figure 1:
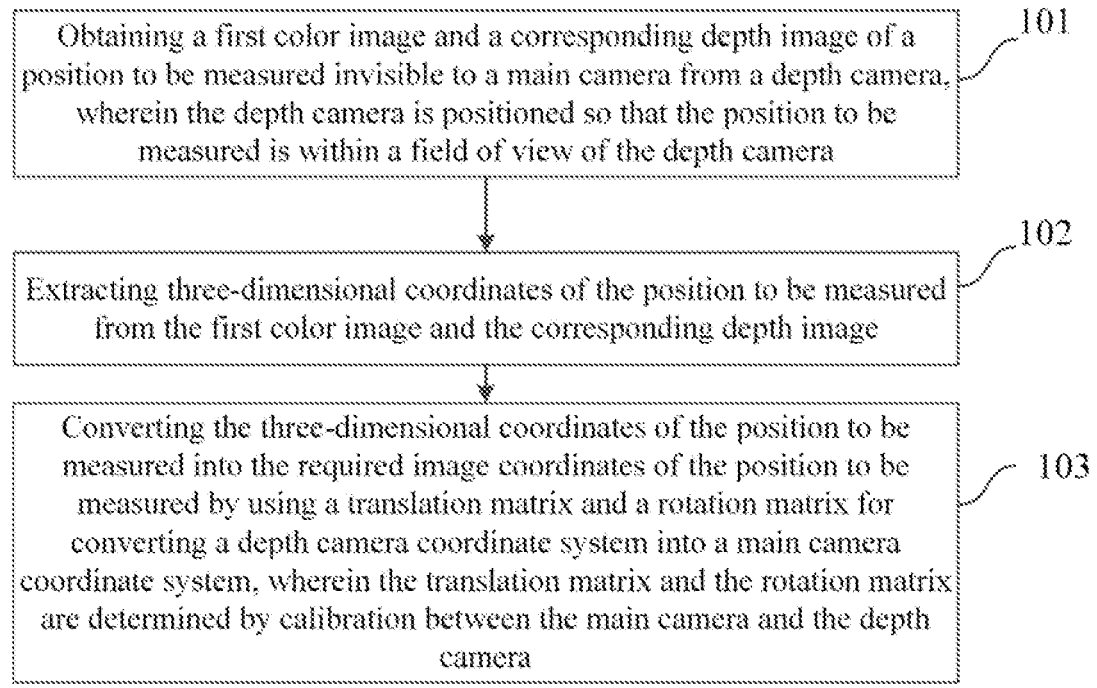
FIG. 1 shows a flowchart of an obtaining method for image coordinates of a position invisible to a camera according to an embodiment of the present disclosure.

In the present disclosure, the image coordinates of the position invisible to the main camera in the coordinate system of the main camera can be obtained by means of a depth camera, which is positioned so that the position invisible to the main camera is within the field of view of the depth camera. In an embodiment, as shown in FIG. 1, an obtaining method for image coordinates of a position invisible to a camera is provided, which may include steps 101-103.

In step 101, a first color image and a corresponding depth image of a position to be measured invisible to a main camera are obtained from a depth camera. In the present disclosure, in order to enable the depth camera to capture the first color image and the corresponding depth image, the depth camera can be positioned so that the position to be measured is within the field of view of the depth camera. In the present disclosure, the main camera may be an IR camera, an RGB camera or other camera that can be used to collect color images. In addition, in the present disclosure, the position to be measured invisible to the main camera refers to the position to be measured outside the field of view of the main camera, for example, just as an example, the position to be measured directly behind (i.e., behind) the main camera. When the position to be measured is directly behind the main camera, in order to make the position to be measured fall within the field of view of the depth camera, the depth camera can be positioned directly opposite to the main camera.

The position to be measured can be a position area to be measured. For example, the position area to be measured can be an area on the vehicle that is not visible to the main camera, such as the rear-view mirror, front window glass, instrument panel, etc. At this time, the image coordinates of the position to be measured to be obtained include the image coordinates of each boundary point of the position area to be measured (for example, each contour point forming the contour of the concave area on the road), that is, the image coordinates of each boundary point (i.e., each boundary pixel point) in the main camera coordinate system.

The position to be measured can also be a position point to be measured. The position point to be measured can be, for example, a position point on the rear-view mirror, front window glass, instrument panel, etc. invisible to the main camera. At this time, the image coordinates of the position to be measured to be obtained include the image coordinates of the position point to be measured, that is, the image coordinates of the position point to be measured (the pixel point of the position to be measured) in the main camera coordinate system.

In step 102, the three-dimensional coordinates of the position to be measured (i.e., the three-dimensional coordinates of the position to be measured in the depth camera coordinate system) are extracted from the first color image and the corresponding depth image. For example, when the position to be measured is the position area to be measured, the three-dimensional coordinates of the whole position area to be measured in the depth camera coordinate system can be represented by V, where, $V=(X,Y,Z)$, $X=[x_1, x_2 \ldots]$, $Y=[y_1, y_2, \ldots]$, $Z=[z_1, z_2, \ldots]$. $(x_n, y_n, z_n)$ represents the three-dimensional coordinates of the n-th boundary point of the positon area to be measured (that is, the three-dimensional coordinates of the n-th boundary point in the depth camera coordinate system), and n is an integer greater than or equal to 1 and less than or equal to the total number of boundary points.

In step 103, the three-dimensional coordinates of the position to be measured are converted into the required image coordinates of the position to be measured (i.e., the image coordinates of the position to be measured in the main camera coordinate system) by using a translation matrix and a rotation matrix for converting a depth camera coordinate system into a main camera coordinate system. The translation matrix and the rotation matrix are determined by calibration between the main camera and the depth camera. In the present disclosure, calibration refers to the process for solving the translation matrix and rotation matrix for converting the depth camera coordinate system into the main camera coordinate system mentioned above. An example implementation of the calibration method between the main camera and the depth camera will be described in more detail below in connection with FIG. 2.

For example, the converting formula $v_{ir}=v*R+T$ can be used to convert the three-dimensional coordinates of the position to be measured into the image coordinates of the position to be measured (that is, the image coordinates of the position to be measured in the main camera coordinate system), where $v_{ir}$ represents the image coordinates of a position point (i.e., the image coordinates of the position point in the main camera coordinate system), v represents the three-dimensional coordinates of the position point (i.e., the three-dimensional coordinate of the position point in the depth camera coordinate system), R represents the rotation matrix used to convert the depth camera coordinate system into the main camera coordinate system, and T represents the translation matrix used to convert the depth camera coordinate system to the main camera coordinate system. In this disclosure, when the position to be measured is the position point to be measured, $v_{ir}$ represents the image coordinates of the position point to be measured in the main camera coordinate system, and v represents the three-dimensional coordinates of the position point to be measured in the depth camera coordinate system. When the position to be measured is the position area to be measured, each boundary point of the position area to be measured can be calculated separately by using the above converting formula, so as to obtain the image coordinates of the whole position area to be measured in the main camera coordinate system.

Figure 2:
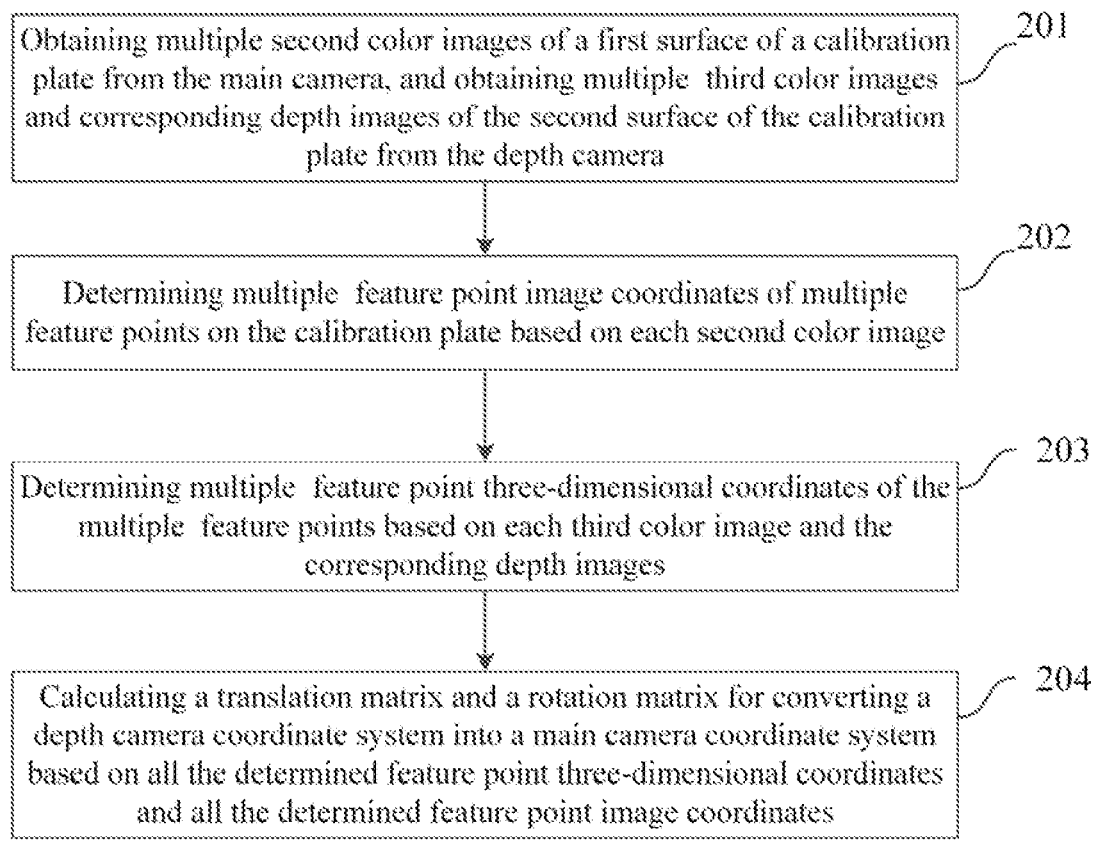
FIG. 2 shows a calibration method between a main camera and a depth camera according to an embodiment of the present disclosure.

In an embodiment, as shown in FIG. 2, the present disclosure provides a calibration method between the main camera and the depth camera. The depth camera is positioned so that the expected position to be measured invisible to the main camera is within a field of view of the depth camera. The calibration method may include steps 201-204.

Figure 3:
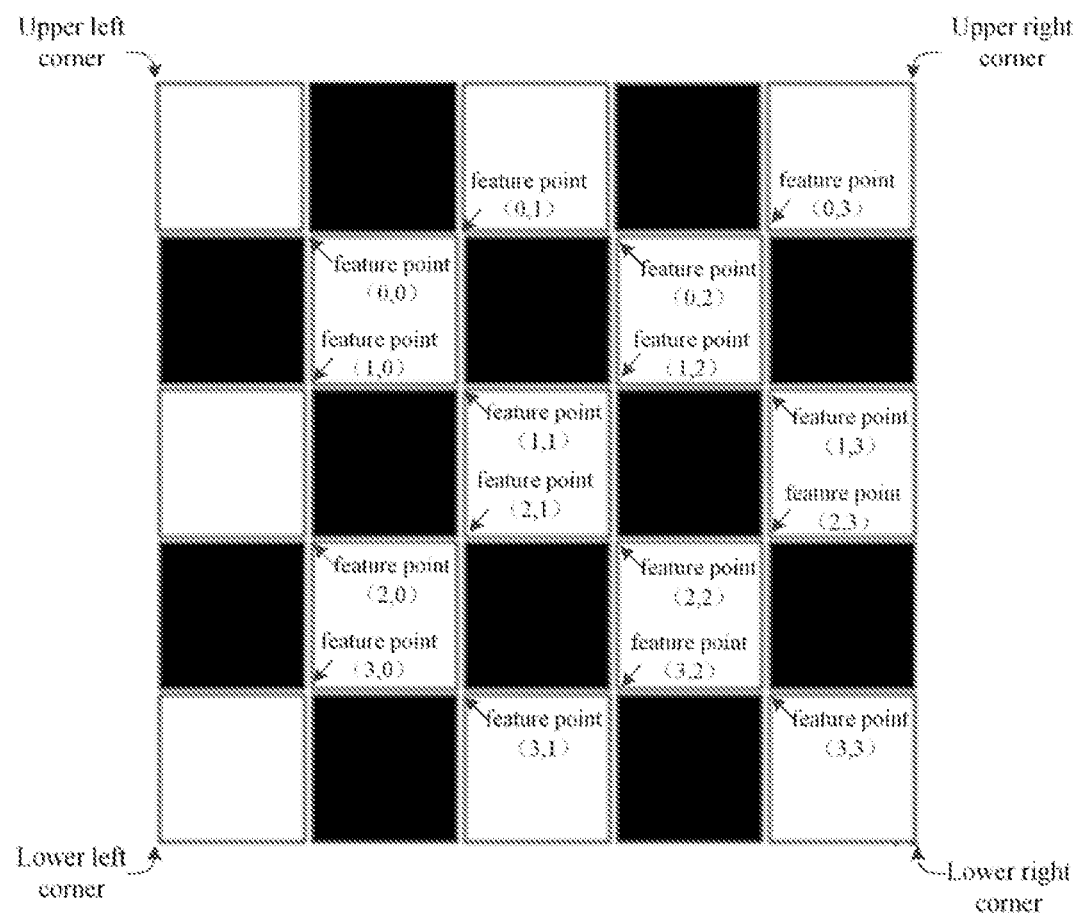
FIG. 3 shows an example schematic diagram of a first surface of a calibration plate according to an embodiment of the present disclosure.

In step 201, multiple second color images of a first surface of a calibration plate are obtained from the main camera, and multiple third color images and corresponding depth images of the second surface of the calibration plate are obtained from the depth camera. In an implementation, in order for the main camera to capture multiple second color images of the first surface of the calibration plate and the depth camera to capture multiple third color images of the second surface of the calibration plate, the calibration plate may be placed between the main camera and the depth camera, the first surface of the calibration plate is within the field of view of the main camera, and the second surface of the calibration plate is located within the field of view of the depth camera. In addition, in order to realize the calibration between the main camera and the depth camera, the first surface of the calibration plate may include multiple feature points, and the second surface of the calibration plate may include multiple marking points related to multiple feature points. For example, in one example, the first surface of the calibration plate may include a chessboard grid plane composed of multiple squares (as shown in FIG. 3), and the intersections of any four adjacent squares in these squares (for example, the intersection (0,0), intersection (0,1), intersection (1,0) . . . marked in FIG. 3) are set as multiple feature points on the calibration plate. The second surface of the calibration plate may include at least three marking points, and each marking point is located on a position on the second surface opposite to one of four corners of the chessboard grid plane (i.e., the upper left corner, the upper right corner, the lower left corner and the lower right corner of the chessboard grid plane). For example, the at least three marking points may be marking points located on the second surface of the calibration plate opposite to the upper left corner, upper right corner and lower left corner of the chessboard grid plane. For another example, the at least three marking points can also be marking points located on the second surface of the calibration plate opposite to the upper left corner, upper right corner and lower right corner of the chessboard grid plane. For another example, the second surface of the calibration plate may include four marking points, which are the marking points located on the second surface of the calibration plate opposite to the upper left corner, upper right corner, lower left corner and lower right corner of the chessboard grid plane. Of course, the above is only an example, and those skilled in the art can expect other similar marking methods based on the above examples. In addition, in one example, the chessboard grid plane can be composed of 9*9 squares, and of course, it can also be composed of other numbers of squares. In one implementation, the first surface of the calibration plate can be the front of the calibration plate, and the second surface of the calibration plate is the back of the calibration plate.

In an embodiment, the multiple second color images can be captured by the main camera when the calibration plate is in multiple different poses, and the multiple third color images and the corresponding depth images are captured by the depth camera when the calibration plate is in the above multiple different poses respectively. Thus, the rotation matrix and translation matrix calculated by this method can cover various positions to be measured.

In step 202, multiple feature point image coordinates of multiple feature points on the calibration plate, that is, multiple image coordinates of multiple feature points on the calibration plate in the main camera coordinate system, are determined based on each second color image.

In the example of the checkerboard grid plane mentioned above, the intersection image coordinates of all these intersections can be directly extracted from the second color images as the image coordinates of the multiple feature points.

In step 203, multiple feature point three-dimensional coordinates of the multiple feature points are determined based on each third color image and the corresponding depth image.

In the example of the checkerboard grid plane mentioned above, step 203 may further include: extracting marking point three-dimensional coordinates of each marking point (that is, the three-dimensional coordinates of each marking point in the depth camera coordinate system) from the third color images and the corresponding depth images, and calculating intersection three-dimensional coordinates of all the intersections (that is, the three-dimensional coordinates of all these intersections in the depth camera coordinate system) as the multiple feature point three-dimensional coordinates based on all the marking point three-dimensional coordinates.

For example, the intersection three-dimensional coordinates of the intersection point (i.e. feature point) of row i and column j can be calculated based on the following formula:

$$v_{i,j} = v_{top\_right} + (i+1)*(v_{top\_left} - v_{top\_right})/m + (j+1)*(v_{bottom\_left} - v_{top\_left})/n \quad (1)$$

Where, $v_{top\_right}$ is the marking point located at the upper right corner of the second surface of the calibration plate (that is, the marking point located at the position on the second surface of the calibration plate opposite to the upper left corner of the chessboard grid plane (for example, the upper left corner marked in FIG. 3), $v_{top\_left}$ is the marking point located at the upper left corner of the second surface of the calibration plate (that is, the marking point located at the position on the second surface of the calibration plate opposite to the upper right corner of the chessboard grid plane (for example, the upper right corner marked in FIG. 3), and $v_{bottom\_left}$ is the marking point located at the lower left corner of the second surface of the calibration plate (that is, the marking point located at the position on the second surface of the calibration plate opposite to the lower right corner of the chessboard grid plane (for example, the lower right corner marked in FIG. 3). m represents the number of squares in the transverse direction of the chessboard grid plane, n represents the number of squares in the longitudinal direction of the chessboard grid plane, i is an integer less than or equal to m−2, and j is an integer less than or equal to n−2.

In the above formula (1), the intersection (i.e. feature point) of row i and column j can be taken, for example, according to the representation method of each feature point shown in FIG. 3, so as to ensure that there is a corresponding relationship between the multiple feature point three-dimensional coordinates calculated in step 203 and the feature point image coordinates determined in step 202.

Those skilled in the art should understand that the above formula is only an example. When the marking points on the second surface of the calibration plate are different, the above formula will be slightly different.

In step 204, based on all the feature point determined three-dimensional coordinates and all the determined feature point image coordinates, the translation matrix and rotation matrix for converting the depth camera coordinate system into the main camera coordinate system are calculated.

As mentioned above, in the present disclosure, multiple third color images and corresponding depth images are obtained (for example, N third color images and corresponding depth images can be obtained), and multiple feature point three-dimensional coordinates are determined based on each third color image and the corresponding depth image (for example, K feature point three-dimensional coordinates, for example, in the example of FIG. 3, determine 16 feature point three-dimensional coordinates for each third color image and the corresponding depth image). In order to calculate the translation matrix and rotation matrix, all the feature point three-dimensional coordinates are spliced together to form a two-dimensional matrix, in which the three columns of the two-dimensional matrix respectively indicate the three coordinate values of each the feature point three-dimensional coordinates, and each row represents a feature point, so all rows can indicate all feature points of all N images.

Similarly, in the present disclosure, multiple second color images are also obtained (for example, N second color images are also obtained). And multiple feature point image coordinates are determined based on each second color image (for example, K feature point image coordinates, for example, in the example of FIG. 3, determine 16 feature point image coordinates for each the second color image). When calculating the translation matrix and rotation matrix, all the feature point image coordinates are also spliced together to form another two-dimensional matrix, in which the three columns of the two-dimensional matrix respectively indicate the two coordinate values of each the feature point image coordinates, and each row represents a feature point, so all rows can indicate all the feature points of all N images.

The way to calculate the translation matrix and rotation matrix based on these two two-dimensional matrices can be realized by the way known in the art or the way to be developed, which will not be repeated in detail in this specification.

Figure 4:
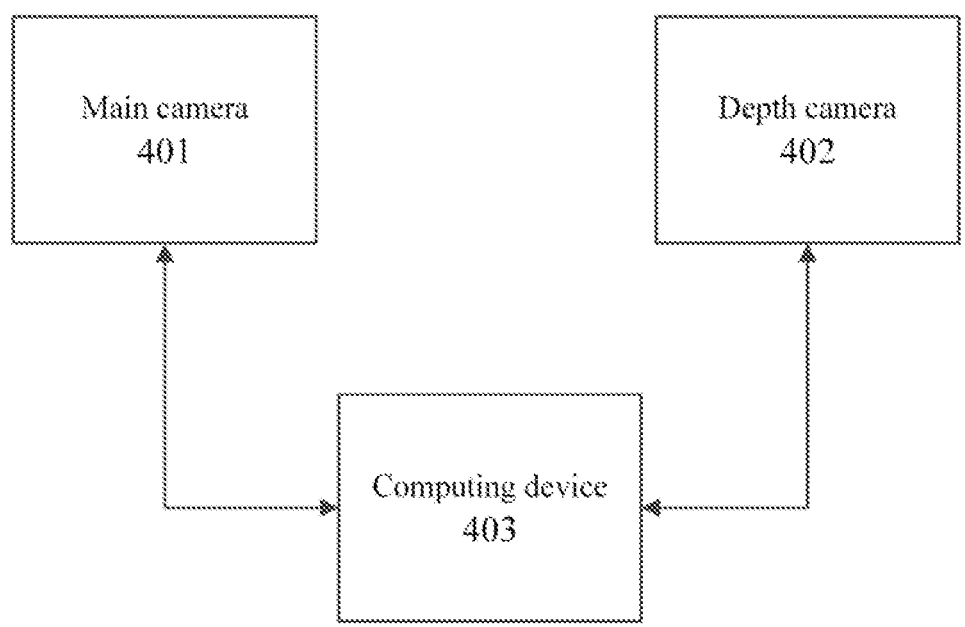
FIG. 4 shows a structural block diagram of an obtaining system for image coordinates of a position invisible to a camera according to an embodiment of the present disclosure.

In another embodiment, as shown in FIG. 4, an obtaining system for image coordinates of a position invisible to a camera is provided. The obtaining system includes a main camera 401, a depth camera 402 and a computing device 403. Both the main camera 401 and the depth camera 402 are connected with the computing device 403. The depth camera 402 is positioned so that the position to be measured is within a field of view of the depth camera. The computing device 403 includes a processor that, when in operation, implements the obtaining method described above in connection with FIG. 1.

Figure 5:
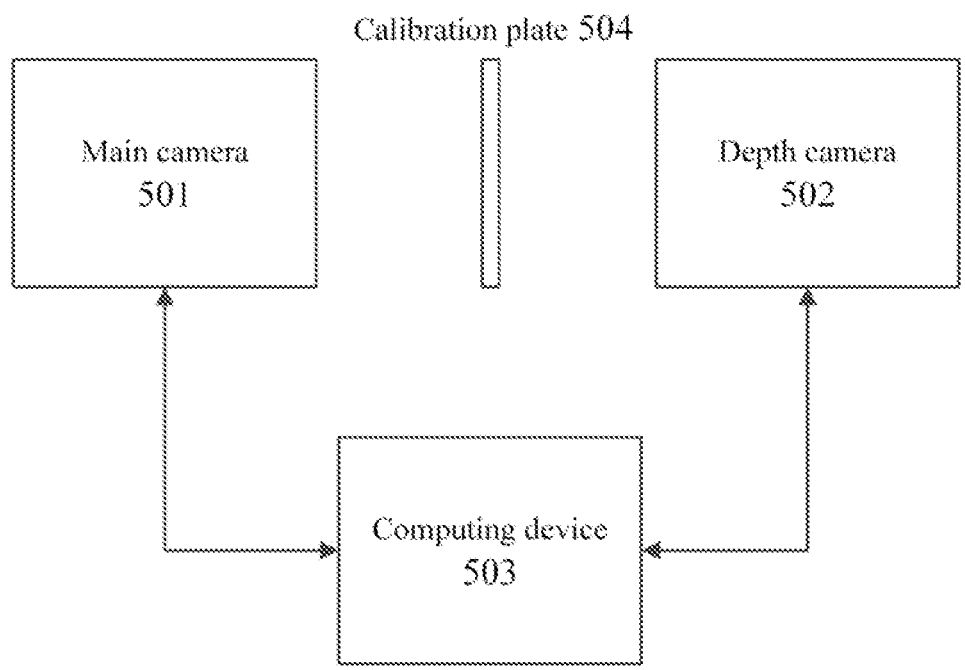
FIG. 5 shows a structural block diagram of a calibration system between a main camera and a depth camera according to an embodiment of the present disclosure.

In another embodiment, as shown in FIG. 5, a calibration system between a main camera and a depth camera is provided. The calibration system may include a main camera 501, a depth camera 502, a calibration plate 504 and a computing device 503, and both the main camera 501 and the depth camera 502 are connected with the computing device 503. In one example, for example, when calibration needs to be performed between the main camera 401 and the depth camera 402 shown in FIG. 4, the main camera 501, the depth camera 502 and the computing device 503 in FIG. 5 represent the main camera 401, the depth camera 402 and the computing device 403 in FIG. 4, respectively.

In the calibration system, the main camera 501 is configured to capture multiple second color images of a first surface of the calibration plate 504.

The depth camera 502 is positioned so that an expected position to be measured invisible to the main camera 501 is within a field of view of the depth camera 502, and is configured to capture multiple third color images and corresponding depth images of a second surface of the calibration plate 504.

The computing device 503 includes a processor that, when in operation, implements the calibration method described above in connection with FIG. 2.

In an embodiment, the calibration plate 504 is placed between the main camera 501 and the depth camera 502, the first surface of the calibration plate 505 is within the field of view of the main camera 501, and the second surface of the calibration plate 504 is within the field of view of the depth camera 502. The first surface of the calibration plate 504 includes the multiple feature points, and the second surface of the calibration plate 504 includes multiple marking points related to the multiple feature points. For example, in one example, the first surface of the calibration plate may include a chessboard grid plane composed of multiple squares (as shown in FIG. 3). The multiple feature points are the intersections of any four adjacent squares in these squares (for example, the intersection (0,0), intersection (0,1), intersection (1,0) . . . marked in FIG. 3), and the second surface of the calibration plate includes at least three marking points. Each marking point is located on the second surface of the calibration plate opposite to one of the four corners (that is, the upper left corner, the upper right corner, the lower left corner and the lower right corner of the chessboard grid plane) of the chessboard grid plane.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. An obtaining method for image coordinates of a position invisible to a camera, comprising:
    obtaining a first color image and a corresponding depth image of a position to be measured invisible to a main camera from a depth camera, wherein the depth camera is positioned so that the position to be measured is within a field of view of the depth camera;
    extracting three-dimensional coordinates of the position to be measured from the first color image and the corresponding depth image; and
    converting the three-dimensional coordinates of the position to be measured into required image coordinates of the position to be measured by using a translation matrix and a rotation matrix for converting a depth camera coordinate system into a main camera coordinate system, wherein the translation matrix and the rotation matrix are determined by calibration between the main camera and the depth camera.

2. The obtaining method of claim 1, wherein the position to be measured is directly behind the main camera, and the depth camera is positioned in a position directly opposite to the main camera.

3. The obtaining method of claim 1, wherein the position to be measured is a position area to be measured, and the image coordinates of the position to be measured comprise image coordinates of each boundary point of the position area to be measured.

4. The obtaining method of claim 1, wherein the position to be measured is a position point to be measured, and the image coordinates of the position to be measured comprise image coordinates of the position point to be measured.

5. A calibration method between a main camera and a depth camera, wherein the depth camera is positioned so that the expected position to be measured invisible to the main camera is within a field of view of the depth camera;
    the calibration method comprises:
        obtaining a plurality of color images of a first surface of a calibration plate from the main camera, and obtaining a plurality of color images and corresponding depth images of the second surface of the calibration plate from the depth camera;
        determining a plurality of feature point image coordinates of a plurality of feature points on the calibration plate based on each color image obtained by the main camera;
        determining a plurality of feature point three-dimensional coordinates of the plurality of feature points based on each color image obtained by depth camera and the corresponding depth images; and
        calculating a translation matrix and a rotation matrix for converting a depth camera coordinate system into a main camera coordinate system based on all the determined feature point three-dimensional coordinates and all the determined feature point image coordinates.

6. The calibration method of claim 5, wherein the calibration plate is placed between the main camera and the depth camera, the first surface of the calibration plate is within the field of view of the main camera, and the second surface of the calibration plate is within the field of view of the depth camera; the first surface of the calibration plate comprises the plurality of feature points, and the second surface of the calibration plate comprises a plurality of marking points related to the plurality of feature points.

7. The calibration method of claim 5, wherein the plurality of color images are captured by the main camera when the calibration plate is in a plurality of different poses, and the plurality of color images obtained by depth camera and the corresponding depth images are captured by the depth camera when the calibration plate is in a plurality of different poses.

8. The calibration method claim 5, wherein the first surface of the calibration plate is a front of the calibration plate, and the second surface of the calibration plate is a back of the calibration plate.

9. The calibration method of claim 6, wherein the first surface comprises a chessboard grid plane composed of a plurality of squares, the plurality of feature points are intersections of any four adjacent squares in the plurality of squares; the second surface comprises at least three marking points, and each marking point is located on a position on the second surface opposite to one of four corners of the chessboard grid plane.

10. The calibration method of claim 9, wherein the step of determining a plurality of feature point three-dimensional coordinates of the plurality of feature points based on each color image obtained by depth camera and the corresponding depth images comprises:

extracting marking point three-dimensional coordinates of each marking point from the color images obtained by depth camera and the corresponding depth images; and calculating intersection three-dimensional coordinates of all the intersections as the plurality of feature point three-dimensional coordinates based on all the marking point three-dimensional coordinates.

11. The calibration method of claim 9, wherein the step of determining a plurality of feature point image coordinates of a plurality of feature points on the calibration plate based on each color image comprises:

extracting the intersection image coordinates of all the intersections from the color images as the plurality of feature point image coordinates.

12. An obtaining system for image coordinates of a position invisible to a camera, comprising a main camera, a depth camera and a computing device, wherein both the main camera and the depth camera are connected with the computing device;

the depth camera is positioned so that the position to be measured invisible to the main camera is within a field of view of the depth camera, and is configured to capture a first color image and a corresponding depth image of the position to be measured invisible to the main camera; and the computing device comprises a processor that, when in operation, implements the obtaining method of claim 1.

13. A calibration system between a main camera and a depth camera, comprising a main camera, a depth camera, a calibration plate and a computing device, wherein both the main camera and the depth camera are connected with the computing device;

the main camera is configured to capture a plurality of color images of a first surface of the calibration plate;

the depth camera is positioned so that an expected position to be measured invisible to the main camera is within a field of view of the depth camera, and is configured to capture a plurality of color images obtained by depth camera and corresponding depth images of a second surface of the calibration plate; and the computing device comprises a processor that, when in operation, implements the calibration method of claim 5.

14. The calibration system of claim 13, wherein the calibration plate is placed between the main camera and the depth camera, the first surface of the calibration plate is within the field of view of the main camera, and the second surface of the calibration plate is within the field of view of the depth camera; the first surface of the calibration plate comprises the plurality of feature points, and the second surface of the calibration plate comprises a plurality of marking points related to the plurality of feature points.

* * * * *